(12) United States Patent
Greenberg et al.

(10) Patent No.: US 10,711,700 B2
(45) Date of Patent: Jul. 14, 2020

(54) GAS TURBINE START SYSTEM TO ENABLE ROTOR THERMAL STABILIZATION WITH BACKUP BLEED BYPASS COOLING MODE

(71) Applicant: United Technologies Corporation, Farmington, CT (US)

(72) Inventors: Michael D. Greenberg, Bloomfield, CT (US); Robert Goodman, West Hartford, CT (US); David Gelwan, West Hartford, CT (US); Jesse W. Clauson, Agawam, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 635 days.

(21) Appl. No.: 15/421,598

(22) Filed: Feb. 1, 2017

(65) Prior Publication Data

US 2018/0216537 A1 Aug. 2, 2018

(51) Int. Cl.
| | |
|---|---|
| *F02C 7/27* | (2006.01) |
| *F02C 7/36* | (2006.01) |
| *F02C 9/18* | (2006.01) |
| *F02C 7/277* | (2006.01) |
| *F01D 19/02* | (2006.01) |

(52) U.S. Cl.
CPC .............. *F02C 7/27* (2013.01); *F01D 19/02* (2013.01); *F02C 7/277* (2013.01); *F02C 7/36* (2013.01); *F02C 9/18* (2013.01); *F05D 2260/85* (2013.01)

(58) Field of Classification Search
CPC .... F02C 7/26; F02C 7/268; F02C 7/27; F02C 7/275; F02C 7/277; F05D 2260/85; F05D 2260/96; F05D 2220/50; F01D 19/00; F01D 19/02; F01D 25/34
See application file for complete search history.

(56) References Cited

U.S. PATENT DOCUMENTS

| | | | | |
|---|---|---|---|---|
| 3,921,955 A | * | 11/1975 | Haddad, Jr. ............. | F16K 1/221 251/297 |
| 6,684,898 B2 | * | 2/2004 | Wiggins .................. | F02C 7/277 137/15.25 |

(Continued)

OTHER PUBLICATIONS

Extended European Search Report for Application No. 18154540. 1-1007; Report dated Jun. 21, 2018; 7 pages.

*Primary Examiner* — Gerald L Sung
*Assistant Examiner* — Rene D Ford
(74) *Attorney, Agent, or Firm* — Cantor Colburn LLP (57) ABSTRACT

A system is provided comprising: a starter air valve in fluid communication with an air turbine starter to drive motoring of a gas turbine engine responsive to a compressed air flow from a compressed air source; a manual override operably connected to the starter air valve, the manual override is operable to open the starter air valve a select percentage by moving the manual override to a detent engaged position, wherein the select percentage is operable to allow enough airflow to achieve the maximum allowed motoring speed of the gas turbine engine; and a pressure regulating bleed valve in fluid communication with the starter air valve, the pressure regulating bleed valve operable to bleed a portion of the compressed air flow to regulate a motoring speed of the gas turbine engine in response to detection of the manual override in a detent engaged position.

16 Claims, 5 Drawing Sheets

(56) References Cited

U.S. PATENT DOCUMENTS

2003/0145603 A1 8/2003 Reed et al.
2014/0373518 A1* 12/2014 Manneville ............ F01D 19/02
 60/327
2014/0373552 A1 12/2014 Zaccaria et al.

* cited by examiner

GAS TURBINE START SYSTEM TO ENABLE ROTOR THERMAL STABILIZATION WITH BACKUP BLEED BYPASS COOLING MODE

BACKGROUND

The subject matter disclosed herein generally relates to gas turbine engines and, more particularly, to a starter air valve system with a pressure regulating bleed valve for gas turbine engine motoring.

Gas turbine engines are used in numerous applications, one of which is for providing thrust to an airplane. When the gas turbine engine of an airplane has been shut off for example, after the airplane has landed at an airport, the engine is hot and due to heat rise, the upper portions of the engine will be hotter than lower portions of the engine. When this occurs thermal expansion may cause deflection of components of the engine which can result in a "bowed rotor" condition. If a gas turbine engine is in such a bowed rotor condition, it is undesirable to restart or start the engine.

One approach to mitigating a bowed rotor condition is to use a starter system to drive rotation (i.e., cool-down motoring) of a spool within the engine for an extended period of time at a speed below which a resonance occurs (i.e., a critical speed or frequency) that may lead to damage when a sufficiently large bowed rotor condition is present. If a starter air valve of the starter system fails closed, the starter system may be incapable of performing cool-down motoring.

SUMMARY

According to one embodiment, a system is provided. The system comprising: a starter air valve in fluid communication with an air turbine starter to drive motoring of a gas turbine engine responsive to a compressed air flow from a compressed air source; a manual override operably connected to the starter air valve, the manual override is operable to open the starter air valve a select percentage by moving the manual override to a detent engaged position, wherein the select percentage is operable to allow enough airflow to achieve the maximum allowed motoring speed of the gas turbine engine; and a pressure regulating bleed valve in fluid communication with the starter air valve, the pressure regulating bleed valve operable to bleed a portion of the compressed air flow to regulate a motoring speed of the gas turbine engine in response to detection of the manual override in a detent engaged position.

In addition to one or more of the features described above, or as an alternative, further embodiments of the system may include that the pressure regulating bleed valve is located downstream from the starter air valve.

In addition to one or more of the features described above, or as an alternative, further embodiments of the system may include that the manual override is moved to the detent engaged position by rotating the manual override a selected angular rotation.

In addition to one or more of the features described above, or as an alternative, further embodiments of the system may include that the manual override further comprises a detent plate having a detent hole and a detent ball opposite the detent plate, the detent ball is operable to engage the detent hole when the manual override is pushed downward and rotated to the detent engaged position.

In addition to one or more of the features described above, or as an alternative, further embodiments of the system may include the manual override further comprises a first biasing mechanism operable to prevent the detent ball from engaging the detent hole unless the manual override is pushed downward and rotated to the detent engaged position.

In addition to one or more of the features described above, or as an alternative, further embodiments of the system may include that the compressed air source is an auxiliary power unit, a ground cart, or a cross-engine bleed.

According to another embodiment, a system of an aircraft is provided. The system comprising: an air turbine starter coupled to a gearbox; a starter air valve in fluid communication with an air turbine starter to drive motoring of a gas turbine engine responsive to a compressed air flow from a compressed air source; a pressure regulating bleed valve in fluid communication with the starter air valve; and a manual override operably connected to the starter air valve, the manual override is operable to open the starter air valve a select percentage by moving the manual override to a detent engaged position, wherein the select percentage is operable to allow enough airflow to achieve the maximum allowed motoring speed of the gas turbine engine; and a controller operable to actuate the pressure regulating bleed valve to bleed a portion of the compressed air flow to regulate a motoring speed of the gas turbine engine in response to detection of the manual override in a detent engaged position.

In addition to one or more of the features described above, or as an alternative, further embodiments of the system of an aircraft may include that the pressure regulating bleed valve is located downstream from the starter air valve.

In addition to one or more of the features described above, or as an alternative, further embodiments of the system of an aircraft may include that the manual override is moved to the detent engaged position by rotating the manual override a selected angular rotation.

In addition to one or more of the features described above, or as an alternative, further embodiments of the system of an aircraft may include that the manual override further comprises a detent plate having a detent hole and a detent ball opposite the detent plate, the detent ball is operable to engage the detent hole when the manual override is pushed downward and rotated to the detent engaged position.

In addition to one or more of the features described above, or as an alternative, further embodiments of the system of an aircraft may include that the manual override further comprises a first biasing mechanism operable to prevent the detent ball from engaging the detent hole unless the manual override is pushed downward and rotated to the detent engaged position.

In addition to one or more of the features described above, or as an alternative, further embodiments of the system of an aircraft may include that the compressed air source is an auxiliary power unit, a ground cart, or a cross-engine bleed.

According to another embodiment, a method is provided. The method comprising: detecting, by a computer processor, a manual override of a starter air valve in a detent engaged position, wherein the starter air valve is in fluid communication with an air turbine starter to drive motoring of a gas turbine engine responsive to a compressed air flow from a compressed air source; and controlling, by a computer processor, a pressure regulating bleed valve in fluid communication with the starter air valve to bleed a portion of the compressed air flow to regulate a motoring speed of the gas turbine engine in response to detection of the manual override in a detent engaged position; wherein the manual override is operable to open the starter air valve a select percentage by moving the manual override to a detent engaged position, the select percentage being operable to allow enough airflow to achieve the maximum allowed motoring speed of the gas turbine engine.

In addition to one or more of the features described above, or as an alternative, further embodiments of the method may include that the pressure regulating bleed valve is located downstream from the starter air valve.

In addition to one or more of the features described above, or as an alternative, further embodiments of the method may include that the manual override is moved to the detent engaged position by rotating the manual override a selected angular rotation.

In addition to one or more of the features described above, or as an alternative, further embodiments of the method may include that the manual override further comprises a detent plate having a detent hole and a detent ball opposite the detent detent plate, the detent ball is operable to engage the detent hole when the manual override is pushed downward and rotated to the detent engaged position.

In addition to one or more of the features described above, or as an alternative, further embodiments of the method may include that the manual override further comprises a first biasing mechanism operable to prevent the detent ball from engaging the detent hole unless the manual override is pushed downward and rotated to the detent engaged position.

In addition to one or more of the features described above, or as an alternative, further embodiments of the method may include that the compressed air source is an auxiliary power unit, a ground cart, or a cross-engine bleed.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Various embodiments of the present disclosure are related to a bowed rotor start mitigation system in a gas turbine engine. Embodiments can include using a starter air valve to control a rotor speed of a starting spool of a gas turbine engine to mitigate a bowed rotor condition using a cool-down motoring process. Under normal operation during cool-down motoring, the starter air valve can be actively adjusted to deliver air pressure (i.e., compressed air) from an air supply to an air turbine starter of an engine starting system that controls starting spool rotor speed. Cool-down motoring may be performed by running an engine starting system at a lower speed with a longer duration than typically used for engine starting while dynamically adjusting the starter air valve to maintain a rotor speed and/or profile. A critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in a high pressure compressor, for example.

In embodiments, when a starter air valve fails shut, a manual override can be adjusted to partially open the starter air valve, and a pressure regulating bleed valve can be used to establish a regulated pressure to limit a motoring speed of the gas turbine engine below a resonance speed of a starting spool of the gas turbine engine.

Figure 1:
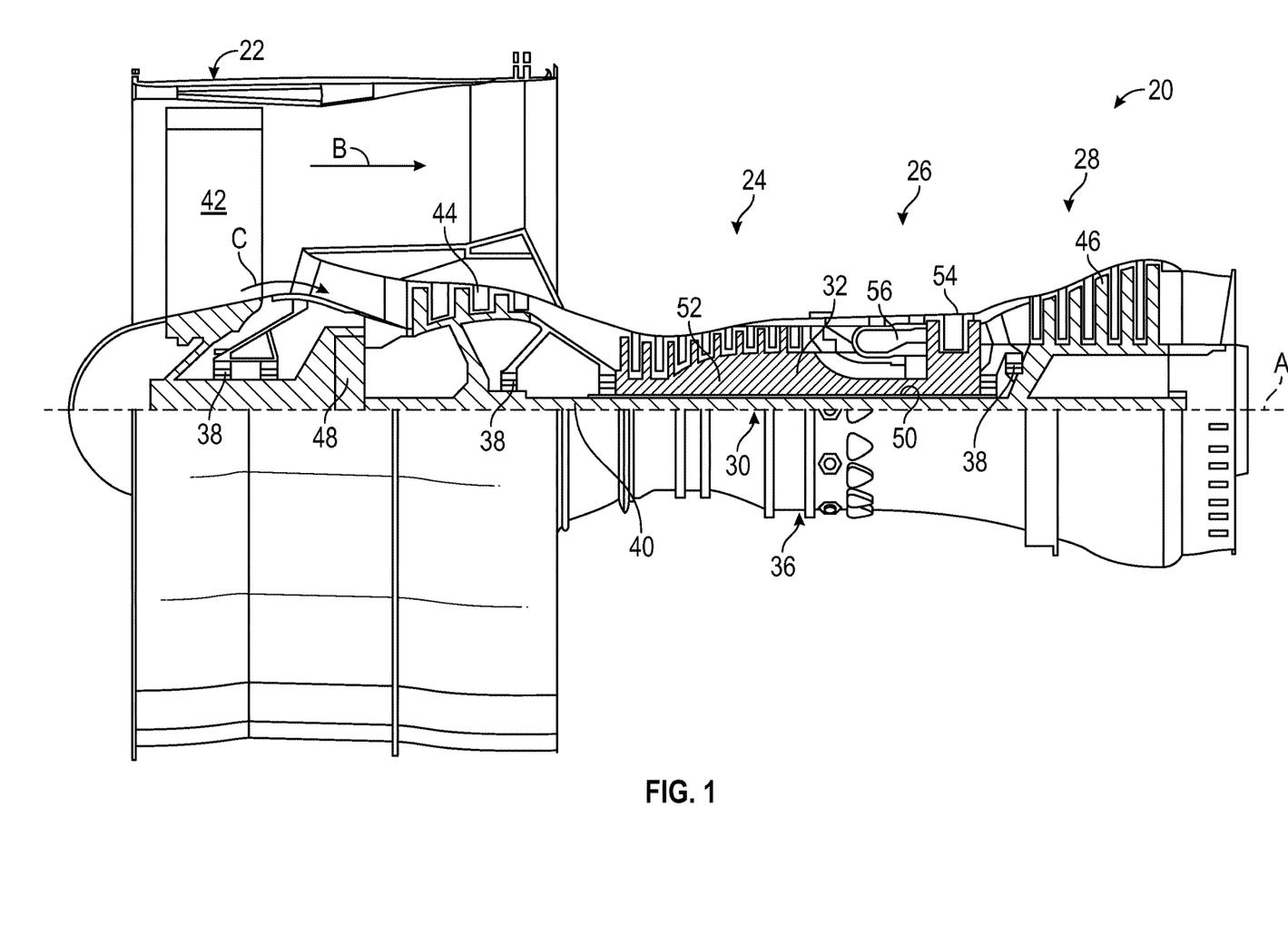
FIG. 1 is a cross-sectional illustration of an aircraft engine, in accordance with an embodiment of the disclosure

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
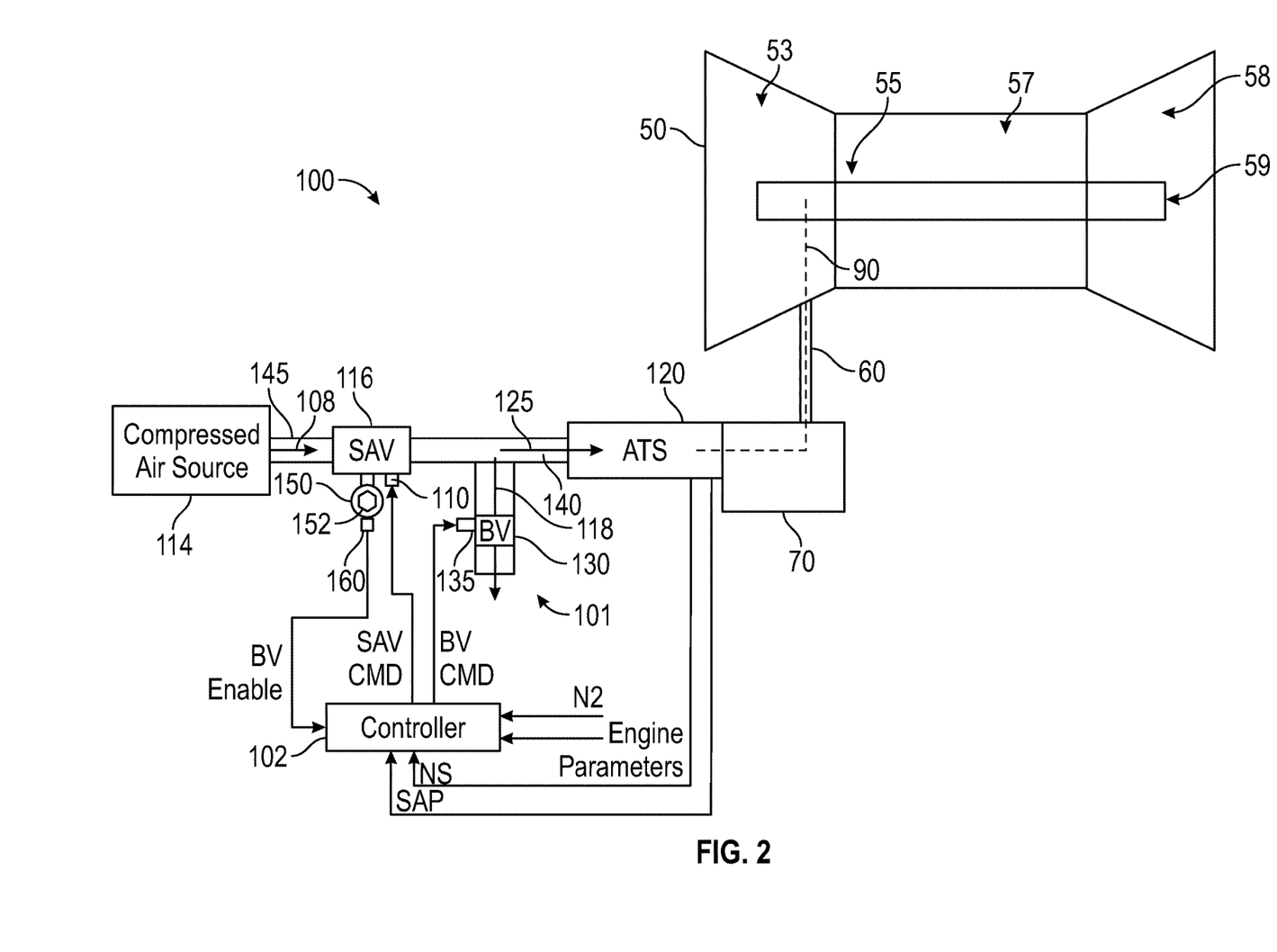
FIG. 2 is a schematic illustration of an aircraft engine starting system, in accordance with an embodiment of the disclosure.

Referring now to FIG. 2, which shows a block diagram of a gas turbine engine 50 and an associated engine starting system 100 with a valve system 101 according to an embodiment of the present disclosure. The valve system 101 includes a starter air valve (SAV) 116 and a pressure regulating bleed valve (BV) 130 operably connected in fluid communication with an air turbine starter (ATS) 120 of the engine starting system 100 through at least one duct 140. In an embodiment, the starter air valve 116 may be a butterfly valve. In another embodiment, the pressure regulating bleed valve 130 may be located downstream from the starter air valve 116. The valve system 101 is operable to receive a compressed air flow 108 from a compressed air source 114 through one or more ducts 145. The compressed air source 114 can be an auxiliary power unit, a ground cart, or a cross-engine bleed. The pressure regulating bleed valve 130 can be driven (e.g., bleed opened/closed) by a bleed actuator 135, such as a torque motor or solenoid, which can be locally or remotely positioned with respect to the pressure regulating bleed valve 130.

The air turbine starter 120 of the engine starting system 100 is operably connected to the gas turbine engine 50 through an accessory gearbox 70 and drive shaft 60 (e.g., a tower shaft), as shown in FIG. 2. As depicted in the example of FIG. 2, the air turbine starter 120 is connected to the gas turbine engine 50 by a drive line 90, which runs from an output of the air turbine starter 120 to the accessory gearbox 70 through the drive shaft 60 to a rotor shaft 59 of the gas turbine engine 50. Operable connections can include gear mesh connections that in some instances can be selectively engaged or disengaged, for instance, through one or more clutches. The air turbine starter 120 is configured to initiate a startup process of the gas turbine engine 50 driving rotation of the rotor shaft 59 of a starting spool 55 of the gas turbine engine 50. The rotor shaft 59 operably connects an engine compressor 53 to an engine turbine 58. Thus, once the engine compressor 53 starts spinning, air is pulled into combustion chamber 57 and mixes with fuel for combustion. Once the air and fuel mixture combusts in the combustion chamber 57, a resulting compressed gas flow drives rotation of the engine turbine 58, which rotates the engine turbine 58 and subsequently the engine compressor 53. Once the startup process has been completed, the air turbine starter 120 can be disengaged from the gas turbine engine 50 to prevent over-speed conditions when the gas turbine engine 50 operates at its normal higher speeds. Although only a single instance of an engine compressor-turbine pair of starting spool 55 is depicted in the example of FIG. 2, it will be understood that embodiments can include any number of spools, such as high/mid/low pressure engine compressor-turbine pairs within the gas turbine engine 50.

The air turbine starter 120 is further operable to drive rotation of the rotor shaft 59 at a lower speed for a longer duration than typically used for engine starting in a motoring mode of operation (also referred to as cool-down motoring) to prevent/reduce a bowed rotor condition. If a bowed rotor condition has developed, for instance, due to a hot engine shutdown and without taking further immediate action, cool-down motoring may be performed by the air turbine starter 120 to reduce a bowed rotor condition by driving rotation of the rotor shaft 59.

A controller 102, such as full authority digital engine control (FADEC), typically controls valve operation, for instance, modulation of the starter air valve 116 to control a motoring speed of the gas turbine engine 50 during cool-down motoring. If the starter air valve 116 fails shut, a corresponding manual override 150 can be used to manually open the starter air valve 116. The manual override 150 can include a tool interface 152 to enable a ground crew to open the starter air valve 116. The manual override is operable to open the starter air valve 116 a select percentage 116 by moving the manual override 150 to a detent engaged position, discussed further. When the starter air valve 116 is opened a select percentage 116, it allows a selected amount of air flow through the starter air valve 116. The select percentage is the most open position necessary of the starter air valve 116 to limit the starter inlet pressure to achieve the maximum allowed motoring speed dependent upon the drag of the gas turbine engine 50. The pressure regulating bleed valve 130 can be controlled to provide a regulated pressure to drive rotation of the air turbine starter 120 for cool-down motoring of the gas turbine engine 50. For example, during the maximum allowed motoring speed case, the bleed valve 130 is closed but during other conditions or where drag torques are lower, the bleed—off valve 130 is modulated by the controller 102 to maintain motoring speed range. In another example, the bleed actuator 135 can selectively open the pressure regulating bleed valve 130 to limit a motoring speed of the gas turbine engine 50 below a resonance speed of the starting spool 55 of the gas turbine engine 50 responsive to a compressed air flow from the compressed air source 114. Control of the pressure regulating bleed valve 130 can be enabled responsive to a manual override state detector 160, which may be a switch or sensor that indicates whether the manual override 150 is in a detent engaged position.

A controller 102, such as a FADEC, can control operation of the gas turbine engine 50 and the valve system 101. In an embodiment, the controller 102 can include memory to store instructions that are executed by one or more processors on one or more channels. The executable instructions may be stored or organized in any manner and at any level of abstraction, such as in connection with a controlling and/or monitoring operation of the gas turbine engine 50 of FIG. 2. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

The controller 102 can be configured with control laws to maintain a motoring speed below a threshold level (i.e., the resonance speed) for the gas turbine engine 50 of FIG. 2 while performing cool-down motoring based on compressed air source 114. In embodiments, the controller 102 can observe various engine parameters and starting system parameters to actively control cool-down motoring and prevent fault conditions from damaging the gas turbine engine 50. For example, controller 102 can observe engine speed (N2) of gas turbine engine 50 and may receive starter system parameters such as starter speed (NS) and/or starter air pressure (SAP).

Under normal operating conditions, one or more channels of the controller 102 can alternate on and off commands to an electromechanical device 110 coupled to the starter air valve 116 to achieve a partially open position of the starter air valve 116 to control a flow of compressed air from compressed air source 114 as a starter air flow to air turbine starter 120 during cool-down motoring. The air turbine starter 120 outputs torque to drive rotation of gas turbine engine shaft 59 of the starting spool 55 of the gas turbine engine 50 of FIG. 2. The controller 102 can monitor engine speed (N2), starter speed (NS), starter air pressure (SAP), and/or other engine parameters to determine an engine operating state and control the starter air valve 116. Thus, the controller 102 can establish a control loop with respect to a motoring speed (N2 and/or NS) and/or starter air pressure (SAP) to adjust positioning of the starter air valve 116.

In some embodiments, the starter air valve 116 is a discrete valve designed as an on/off valve that is typically commanded to either fully opened or fully closed. However, there is a time lag to achieve the fully open position and the fully closed position. By selectively alternating an on-command time with an off-command time through the electromechanical device 110, intermediate positioning states (i.e., partially opened/closed) can be achieved. The controller 102 can modulate the on and off commands (e.g., as a duty cycle using pulse width modulation) to the electromechanical device 110 to further open the starter air valve 116 and increase a rotational speed of the gas turbine engine shaft 59. Pneumatic lines or mechanical linkage (not depicted) can be used to drive the starter air valve 116 between the open position and the closed position. The electromechanical device 110 can be a solenoid that positions the starter air valve 116 based on intermittently supplied electric power as commanded by the controller 102. In an alternate embodiment, the electromechanical device 110 is an electric valve controlling muscle air to adjust the position of the starter air valve 116 as commanded by the controller 102.

In an alternate embodiment, rather than using the electromechanical device 110 to achieve a partially open position of the starter air valve 116, the starter air valve 116 can be a variable position valve that is dynamically adjustable to selected valve angles by the controller 102. When implemented as variable position valves, the starter air valve 116 can be continuous/infinitely adjustable and hold a commanded valve angle, which may be expressed in terms of a percentage open/closed and/or an angular value (e.g., degrees or radians). Performance parameters of the starter air valve 116 can be selected to meet dynamic response requirements. In some embodiments, the controller 102 can monitor a valve angle of the starter air valve 116 when valve angle feedback is available. The controller 102 can establish an outer control loop with respect to motoring speed and an inner control loop with respect to the valve angle of the starter air valve 116.

The controller 102 can track events that impact available compressed air for cool-down motoring at the engine starting system 100. For example, when starter air valve 116 is opened as a result of manual override 150, the controller 102 may command the pressure regulating bleed valve 130 open to regulate a compressed air flow 108 from the compressed air source 114 and adjust a bleed controlled starter air flow 125 by bleeding a portion of the compressed air flow 108 as bleed air 118 to limit the motoring speed of the starting gas turbine engine 50 below a resonance speed of the starting spool 55 of the gas turbine engine 50 responsive to detection of the manual override 150 in an open position. The manual override state detector 160 can be monitored by the controller 102 to detect of the manual override 150 in a detent engaged position as a bleed valve enable signal that initiates the release of bleed air 118 from the pressure regulating bleed valve 130 by driving the bleed actuator 135 to an open position. The bleed valve 130 may be controlled using pulse width modulation.

Figure 3:
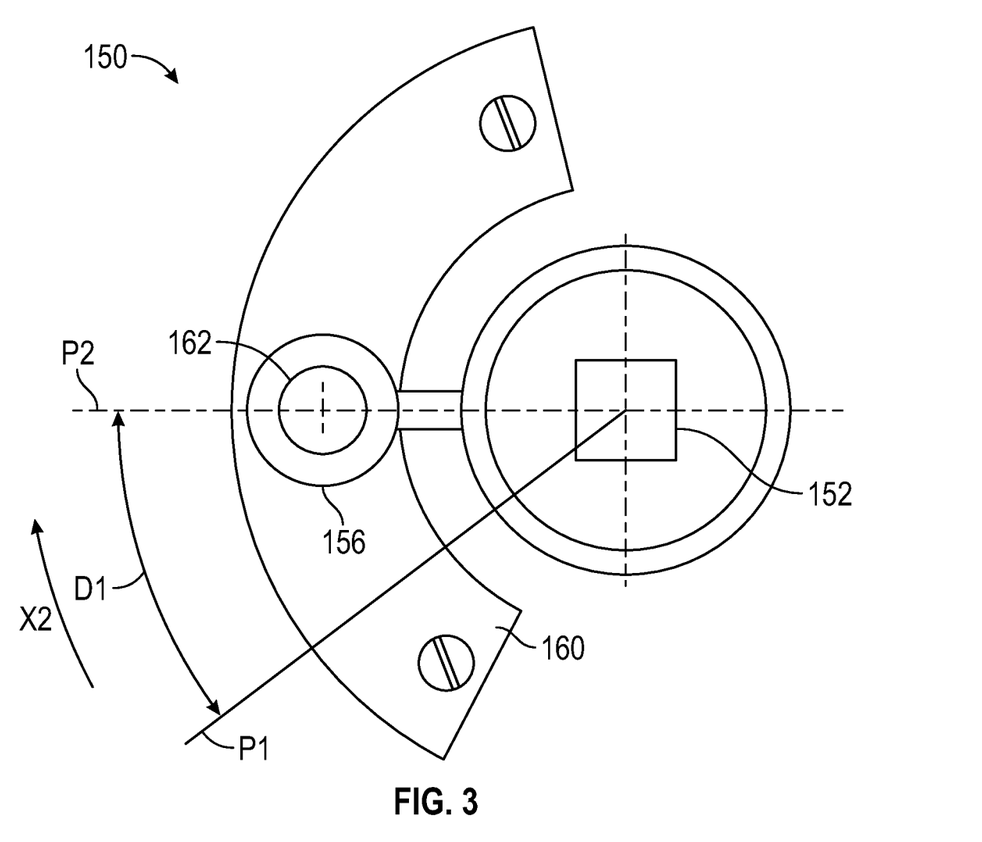
FIG. 3 is a schematic illustration of a manual override of the engine starting system of FIG. 2, in accordance with an embodiment of the disclosure.
Figure 4:
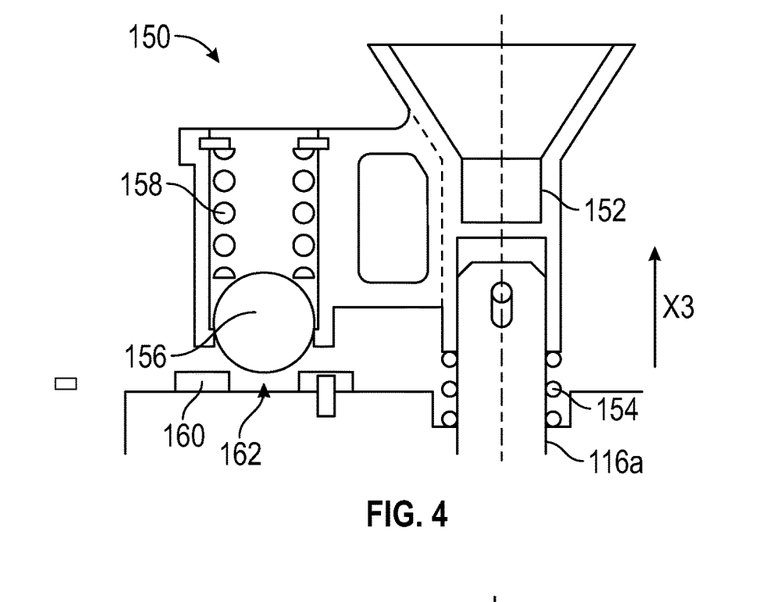
FIG. 4 is a schematic illustration of a manual override of the engine starting system of FIG. 2, in accordance with an embodiment of the disclosure.
Figure 5:
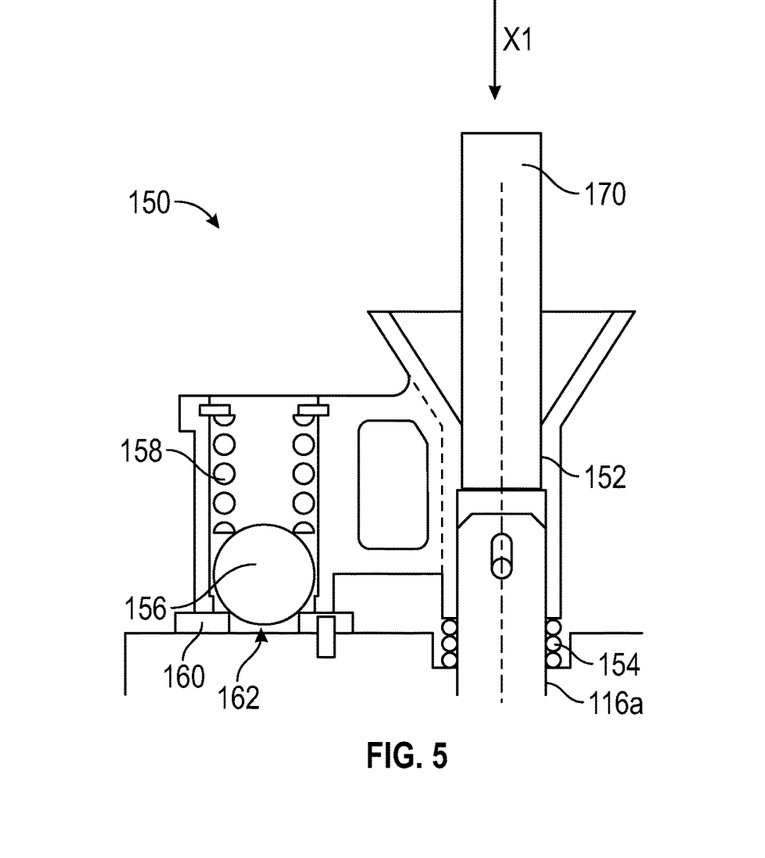
FIG. 5 is a schematic illustration of a manual override of the engine starting system of FIG. 2, in accordance with an embodiment of the disclosure.

Referring now to FIG. 3-5 with continued reference to FIG. 2. FIG. 3 shows a top view of a manual override 150, whereas FIG. 4 shows a side cross-sectional view of the manual override 150 in the detent disengaged position P1 and FIG. 5 shows manual override 150 in the detent engaged position P2. The manual override 150 is operable to open the starter air valve 116 a select percentage when the manual override 150 is rotated over a selected angular rotation D1 from a detent disengaged position P1 to a detent engaged position P2. In an embodiment, the selected angular rotation D1 is about 37°. The manual override 150 remains in the detent disengaged position P1 as seen in FIG. 4 until the starter air valve must be forced open to the detent engaged position P2. The manual override 150 includes a tool interface 152 to enable a ground crew to rotate the manual override 150 and open the starter air valve 116.

As seen in FIG. 5, a tool 170 may be inserted into the tool interface 152, pushed downward X1, and rotated clockwise X2. The downward X1 force from the tool 170 compresses a first biasing mechanism 154. The downward X1 force from the tool 170 also compresses a second biasing mechanism 158 on a detent ball 156, which during rotation of the tool interface 152 is allowed to travel across a detent plate 160 until the detent ball 162 engages (i.e. falls into) a detent hole 162. The detent ball 156 engaging the detent hole provides tactile feedback to the person holding the tool and signals that rotation of the manual override 150 is complete. The rotation of the manual override 150 at the tool interface 152 rotates a shaft 116a connected to the starter air valve 116 and thus once the manual override 150 has been rotated the selected angular rotation D1 to the detent engaged position P2, the starter air valve 116 is in the most open position necessary to limit the starter inlet pressure to achieve the maximum allowed motoring speed dependent upon the drag of the gas turbine engine 50. Thus, during the maximum allowed motoring speed case, the bleed valve 130 is closed but during other conditions or where drag torques are lower, the bleed—off valve 130 is modulated by the controller 102 to maintain motoring speed range. It is important to note that the first biasing mechanism 154 provides an upward X3 force keeping the detent ball 156 out of the dent hole 162 during normal bowed rotor start mitigation where the starter air valve 116 is operational. This helps prevent control issues if the starter air valve 116 is in a position close to or at the detent engaged position P2.

Figure 6:
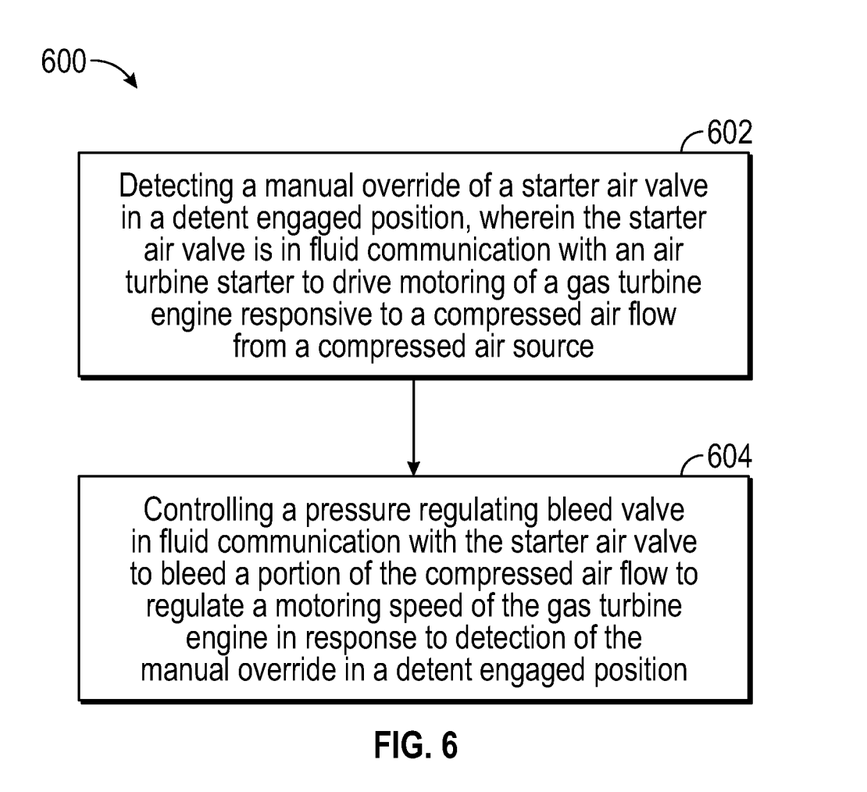
FIG. 6 is a flow process illustrating a method, in accordance with an embodiment of the disclosure.

FIG. 6 is a flow chart illustrating a method 600 for gas turbine engine motoring in accordance with an embodiment. The method 600 of FIG. 6 is described in reference to FIGS. 1-5 and may be performed with an alternate order and include additional steps. Before initiating bowed rotor start mitigation, a bowed rotor determination step can be performed to estimate a need for bowed rotor start mitigation. Examples include the use of models and/or stored/observed engine/aircraft state data of the gas turbine engine 50. A non-responsive starter air valve 116 can be fully opened using the manual override 150, and the process 300 can be performed.

At block 602, a manual override 150 of a starter air valve 116 is detected in a detent engaged position P2 based on the manual override state detector 160. The detection may be completed by a computer processor. The starter air valve 116 is in fluid communication with an air turbine starter 120 to drive motoring of the gas turbine engine 50 responsive to a compressed air flow 108 from a compressed air source 114. The compressed air source 114 can be an auxiliary power unit, a ground cart, or a cross-engine bleed from another engine (not depicted).

At block 604, a pressure regulating bleed valve 130 in fluid communication with the starter air valve 116 is commanded fully open to bleed a portion of the compressed air flow 108 to regulate a motoring speed of the gas turbine engine 50 in response to detection of the manual override 150 in the detent engaged position P2. The air starter valve 116 may be commanded by a computer processor. The manual override 150 is operable to open the starter air valve 116 a select percentage by moving the manual override to a detent engaged position P2. The select percentage being operable to allow enough airflow to achieve the maximum allowed motoring speed of the gas turbine engine 50. The pressure regulating bleed valve 130 is located downstream from the starter air valve 116.

The manual override 150 is moved to the detent engaged position P2 by rotating the manual override 150 a selected angular rotation. As mentioned above, the manual override 150 further comprises a detent plate 160 having a detent hole 162 and a detent ball 156 opposite the detent plate 160. The detent ball 156 is operable to engage the detent hole 162 when the manual override 150 is pushed downward 160 and rotated to the detent engaged position P2. The manual override 150 further comprises a first biasing mechanism 154 operable to prevent the detent ball 156 from engaging the detent hole 162 unless the manual override 150 is pushed downward X1 toward the detent plate 160 and rotated to the detent engaged position P2.

Accordingly and as mentioned above, it is desirable to detect, prevent and/or clear a "bowed rotor" condition in a gas turbine engine that may occur after the engine has been shut down. As described herein and in one non-limiting embodiment, the controller 102 may be programmed to automatically take the necessary measures in order to provide for a modified start sequence without pilot intervention other than the initial start request. In an exemplary embodiment, the controller 102 comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the controller 102 may include, but not be limited to, a processor(s), computer(s), memory, storage, register(s), timing, interrupt(s), communication interfaces, and input/output signal interfaces, as well as combinations comprising at least one of the foregoing. For example, the controller 102 may include input signal filtering to enable accurate sampling and conversion or acquisitions of such signals from communications interfaces. As described above, exemplary embodiments of the disclosure can be implemented through computer-implemented processes and apparatuses for practicing those processes.

Technical effects of embodiments of the present disclosure include using a manual override to partial open a starter air valve by a selected percentage operable to achieve the maximum allowed motoring speed of the gas turbine engine.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
a starter air valve in fluid communication with an air turbine starter to drive motoring of a gas turbine engine responsive to a compressed air flow from a compressed air source;
a manual override operably connected to the starter air valve, the manual override is operable to open the starter air valve a select percentage by moving the manual override to a detent engaged position; and
a pressure regulating bleed valve in fluid communication with the starter air valve, the pressure regulating bleed valve operable to bleed a portion of the compressed air flow to regulate a motoring speed of the gas turbine engine in response to detection of the manual override in a detent engaged position,
wherein the manual override further comprises a detent plate having a detent hole and a detent ball opposite the detent plate, the detent ball is operable to engage the detent hole when the manual override is pushed downward and rotated to the detent engaged position.

2. The system as in claim 1, wherein the pressure regulating bleed valve is located downstream from the starter air valve.

3. The system as in claim 1, wherein the manual override is moved to the detent engaged position by rotating the manual override a selected angular rotation.

4. The system as in claim 1, wherein the manual override further comprises a first biasing mechanism operable to prevent the detent ball from engaging the detent hole unless the manual override is pushed downward and rotated to the detent engaged position.

5. The system as in claim 1, wherein the compressed air source is an auxiliary power unit, a ground cart, or a cross-engine bleed.

6. A system of an aircraft, the system comprising:
an air turbine starter coupled to a gearbox;
a starter air valve in fluid communication with an air turbine starter to drive motoring of a gas turbine engine responsive to a compressed air flow from a compressed air source;
a pressure regulating bleed valve in fluid communication with the starter air valve; and
a manual override operably connected to the starter air valve, the manual override is operable to open the starter air valve a select percentage by moving the manual override to a detent engaged position; and
a computer controller program to actuate the pressure regulating bleed valve to bleed a portion of the compressed air flow to regulate a motoring speed of the gas turbine engine in response to detection of the manual override in a detent engaged position,
wherein the manual override further comprises a detent plate having a detent hole and a detent ball opposite the detent plate, the detent ball is operable to engage the detent hole when the manual override is pushed downward and rotated to the detent engaged position.

7. The system as in claim 6, wherein the pressure regulating bleed valve is located downstream from the starter air valve.

8. The system as in claim 6, wherein the manual override is moved to the detent engaged position by rotating the manual override a selected angular rotation.

9. The system as in claim 6, wherein the manual override further comprises a first biasing mechanism operable to prevent the detent ball from engaging the detent hole unless the manual override is pushed downward and rotated to the detent engaged position.

10. The system as in claim 6, wherein the compressed air source is an auxiliary power unit, a ground cart, or a cross-engine bleed.

11. A method comprising:
detecting, by a computer processor, a manual override of a starter air valve in a detent engaged position, wherein the starter air valve is in fluid communication with an air turbine starter to drive motoring of a gas turbine engine responsive to a compressed air flow from a compressed air source; and
controlling, by the computer processor, a pressure regulating bleed valve in fluid communication with the starter air valve to bleed a portion of the compressed air flow to regulate a motoring speed of the gas turbine engine in response to detection of the manual override in a detent engaged position;
wherein the manual override is operable to open the starter air valve a select percentage by moving the manual override to a detent engaged position.

12. The method as in claim 11, wherein the pressure regulating bleed valve is located downstream from the starter air valve.

13. The method as in claim 11, wherein the manual override is moved to the detent engaged position by rotating the manual override a selected angular rotation.

14. The method as in claim 11, wherein the manual override further comprises a detent plate having a detent hole and a detent ball opposite the detent detent plate, the detent ball is operable to engage the detent hole when the manual override is pushed downward and rotated to the detent engaged position.

15. The method as in claim 11, wherein the manual override further comprises a first biasing mechanism operable to prevent the detent ball from engaging the detent hole unless the manual override is pushed downward and rotated to the detent engaged position.

16. The method as in claim 11, wherein the compressed air source is an auxiliary power unit, a ground cart, or a cross-engine bleed.

* * * * *